(12) United States Patent
Chu et al.

(10) Patent No.: US 10,825,419 B2
(45) Date of Patent: Nov. 3, 2020

(54) COLLISION AVOIDANCE SCHEMES FOR DISPLAYS

(71) Applicant: Apple Inc., Cupertino, CA (US)

(72) Inventors: Yue Jack Chu, San Jose, CA (US); Christopher P. Tann, San Jose, CA (US); Arthur L. Spence, San Jose, CA (US); Brad W. Simeral, San Francisco, CA (US); Yafei Bi, Los Altos Hills, CA (US); Jiayi Jin, Saratoga, CA (US); Ruo-Gu Huang, San Jose, CA (US); Haifeng Li, Campbell, CA (US); Weijun Yao, Saratoga, CA (US); Chaohao Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 15/716,708

(22) Filed: Sep. 27, 2017

(65) Prior Publication Data

US 2019/0027114 A1    Jan. 24, 2019

Related U.S. Application Data

(60) Provisional application No. 62/534,932, filed on Jul. 20, 2017.

(51) Int. Cl.
| | |
|---|---|
| *G06F 3/14* | (2006.01) |
| *G09G 5/00* | (2006.01) |
| *G06T 1/60* | (2006.01) |
| *G09G 5/36* | (2006.01) |
| *G09G 5/395* | (2006.01) |

(52) U.S. Cl.
CPC ............... *G09G 5/006* (2013.01); *G06F 3/14* (2013.01); *G06T 1/60* (2013.01); *G09G 5/363* (2013.01); *G09G 5/395* (2013.01); *G09G 2310/08* (2013.01); *G09G 2320/103* (2013.01); *G09G 2330/022* (2013.01); *G09G 2340/02* (2013.01); *G09G 2340/0435* (2013.01); *G09G 2360/18* (2013.01); *G09G 2370/10* (2013.01)

(58) Field of Classification Search
CPC ............ G09G 5/00; G09G 5/36; G09G 5/006; G09G 5/363; G09G 5/18
See application file for complete search history.

(56) References Cited

U.S. PATENT DOCUMENTS

| | | |
|---|---|---|
| 9,478,191 B2 | 10/2016 | Lee et al. |
| 2015/0103014 A1 | 4/2015 | Lee et al. |

(Continued)

*Primary Examiner* — Michael A Faragalla
(74) *Attorney, Agent, or Firm* — Fletcher Yoder, P.C.

(57) ABSTRACT

In situations with reduced image changes, display panels, such as the ones disclosed herein, may reduce their power consumption by performing self-refresh cycles, in which they may display locally stored data in the display panel instead of retrieving it from an image buffer. Methods and circuitry for management of the self-refresh cycle may reduce jitter, luminance errors, and/or flickers that may be caused by untimely self-refresh cycles that may occur as a result of latency in the image buffer. In some implementations, the display panel may have a dedicated low latency input that notifies an arrival of an incoming image. In some implementations, the self-refresh cycles of the panel may be managed by a host or a buffer that is responsible for sending the images.

20 Claims, 9 Drawing Sheets

(56) References Cited

U.S. PATENT DOCUMENTS

| | | | |
|---|---|---|---|
| 2015/0221061 A1* | 8/2015 | Lee ...................... | G09G 3/2092 |
| | | | 345/522 |
| 2016/0042720 A1* | 2/2016 | Chiang .................... | G09G 5/18 |
| | | | 345/212 |
| 2016/0140923 A1* | 5/2016 | Tanaka ................. | G09G 3/3648 |
| | | | 345/690 |

* cited by examiner

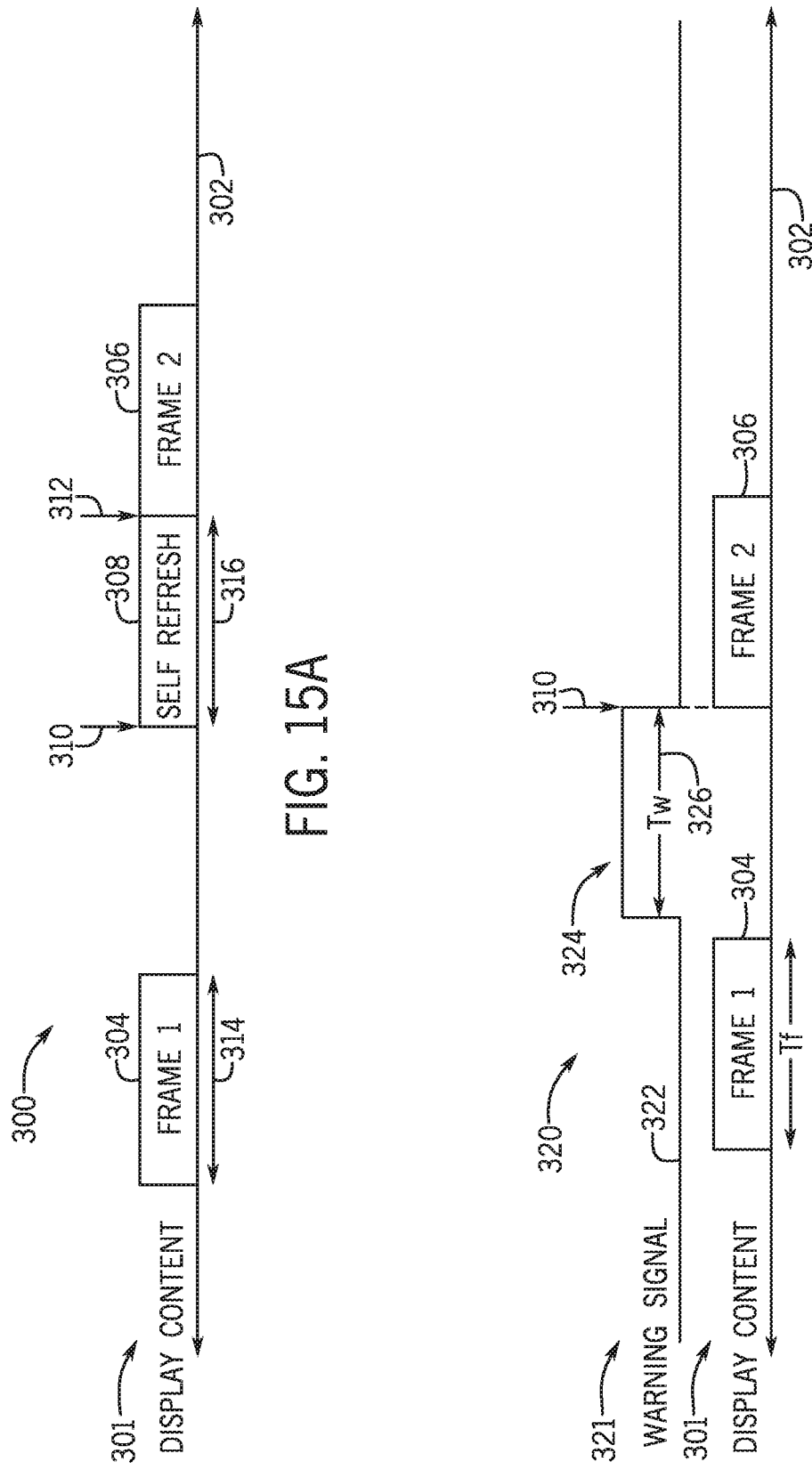

COLLISION AVOIDANCE SCHEMES FOR DISPLAYS

CROSS REFERENCE TO RELATED APPLICATIONS

This application is a Non-Provisional Application claiming priority to U.S. Provisional Patent Application No. 62/534,932, entitled "Collision Avoidance Schemes for Displays," filed Jul. 20, 2017, which is herein incorporated by reference.

BACKGROUND

The present disclosure relates generally to display panel image generation and communication, and more specifically, to methods and systems for managing refresh instructions in displays during transmission of images.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many devices, such as televisions, smartphones, computer panels, smartwatches, among others, include panels that display content and/or images to a user. The panels may be operatively coupled to host circuitry, that may include a processing element, and that provides the image to the panel. In some implementations, panels may also have a self-refresh capability that may be used periodically to provide an image when no new content from a host is available and/or to prevent display damage. In some situations, a display panel self-refresh may delay the display of a new image. This collision may lead to user perceivable delays and/or artifacts, which may be particularly visible when displaying images at a low frequency.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Electronic devices may include displays that allow user interaction with the device. These displays may be configured to display image data produced in a processing circuitry in the device, which may be provided to a frame buffer. In some situations where the rate of images generated by the processing circuitry is low, the display panel may reduce its power consumption by performing self-refresh cycles instead of retrieving image data from the frame buffer. However, latency in the frame buffer may lead to an untimely self-refresh cycle that delays the display of image data, causing user perceivable artifacts. Embodiments described herein discuss display devices and methods that manage the performance of self-refresh cycles to prevent collisions and delays in the exhibition of image data.

In an embodiment, a system is described. The system may have a host that produces image data and self-refresh signals. The system may also have a frame buffer that can receive image data and make it available to a panel. The panel may also be configured to receive the self-refresh signal and perform self-refresh cycles, which may include displaying a previous image when the frame buffer does not receive a new image in a timeout period. The panel may also be configured to wait for new image data instead of performing the self-refresh cycle based on the self-refresh signal received.

In another embodiment, a panel is described. The panel may have a driver integrated circuit (IC) that may be configured to poll a frame buffer for new image data and cause the panel to display the image data if the frame buffer has new image data. If the frame buffer does not have new image data, the frame buffer may poll an image interrupt and, if the image interrupt is not asserted, the driver IC may cause the panel to perform a self-refresh cycle. If the image interrupt is asserted, the driver IC may wait for the frame buffer to receive the new image data corresponding to the image warning.

In another embodiment, an electronic device is described. The electronic device comprises a host configured to provide image data and self-refresh signals to a display device and a display panel driver coupled to the host and configured to cause the panel to display images corresponding to the image data in a presentation time threshold. The display panel driver is also configured to cause the panel to self-refresh based on the self-refresh signal.

BRIEF DESCRIPTION OF THE DRAWINGS

Various aspects of this disclosure may be better understood upon reading the following detailed description and upon reference to the drawings in which:

FIG. 15A is a timing diagram that illustrates the timing for insertion of a self-refresh frame, in accordance with an embodiment; and FIG. 15B is a timing diagram that illustrates the timing for a collision avoidance signal for insertion of a self-refresh frame, in accordance with an embodiment.

DETAILED DESCRIPTION OF SPECIFIC EMBODIMENTS

Figure 1:
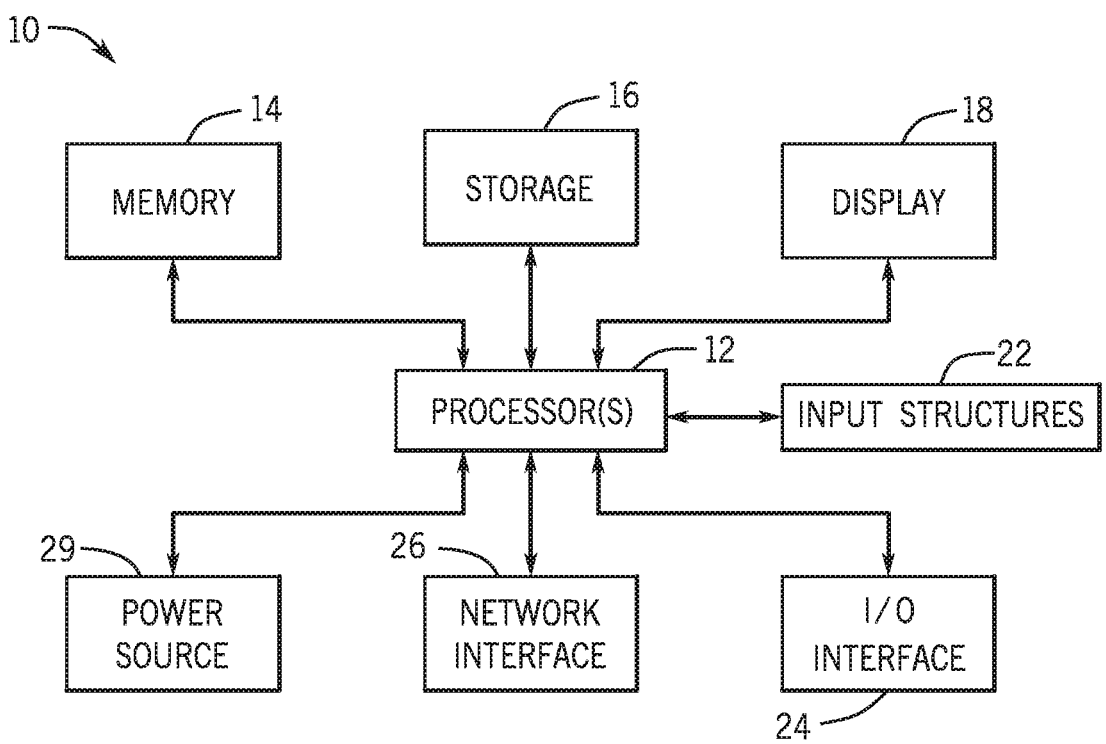
FIG. 1 is a schematic block diagram of an electronic device that may implement collision avoidance schemes for display self-refresh, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Many electronic devices may use displays to provide user interfaces. The displays may be line-based displays, such as cathode-ray tube (CRT) displays, or pixel-based displays, such as light-emitting diode (LED) displays, organic LED (OLED) displays, active-matrix OLED (AMOLED) displays, electronic-ink displays, electronic paper displays, among others. These displays may have a refresh rate that defines the frequency at which the displayed image is updated. Note that in some embodiments, the display may receive images at a variable display update rate. To that end, a display may be operatively coupled to a processor or a graphics-processing unit (GPU) that provides image content to the display. Displays may also be capable of refreshing the displayed image or some provide some other image for maintenance purposes. This self-refreshing activity may also be used to reduce power consumed by the electronic device, in particular when the image provided by the host is substantially static.

In some situations, the self-refresh function may interfere with the display of images provided by the host. For example, if the display is performing a self-refresh cycle, it may prevent the display of a new content recently received from a host, resulting in a display collision. The display panel may resolve the display collision by delaying the display of new content following the end of the self-refresh cycle. However, this activity may lead to user perceivable flicker and/or luminance errors. This effect may be particularly pronounced when the display operates at slower frequency rates (e.g., less than 60 Hz). Embodiments described herein provide methods and circuitry that may be used to manage the self-refresh activity of the display, in view of the content providing activity by the host. Embodiments may include display panels including a faster dedicated input that may be used to notify the display of incoming content. In some embodiments, the host may be responsible for initiating the self-refresh cycles in the panel. Methods and systems described herein also allow multiplexing self-refresh cycle instructions and content instructions in a single data input, as detailed below.

With the foregoing in mind, a general description of suitable electronic devices that may employ displays that employ collision-avoidance schemes discussed herein is provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
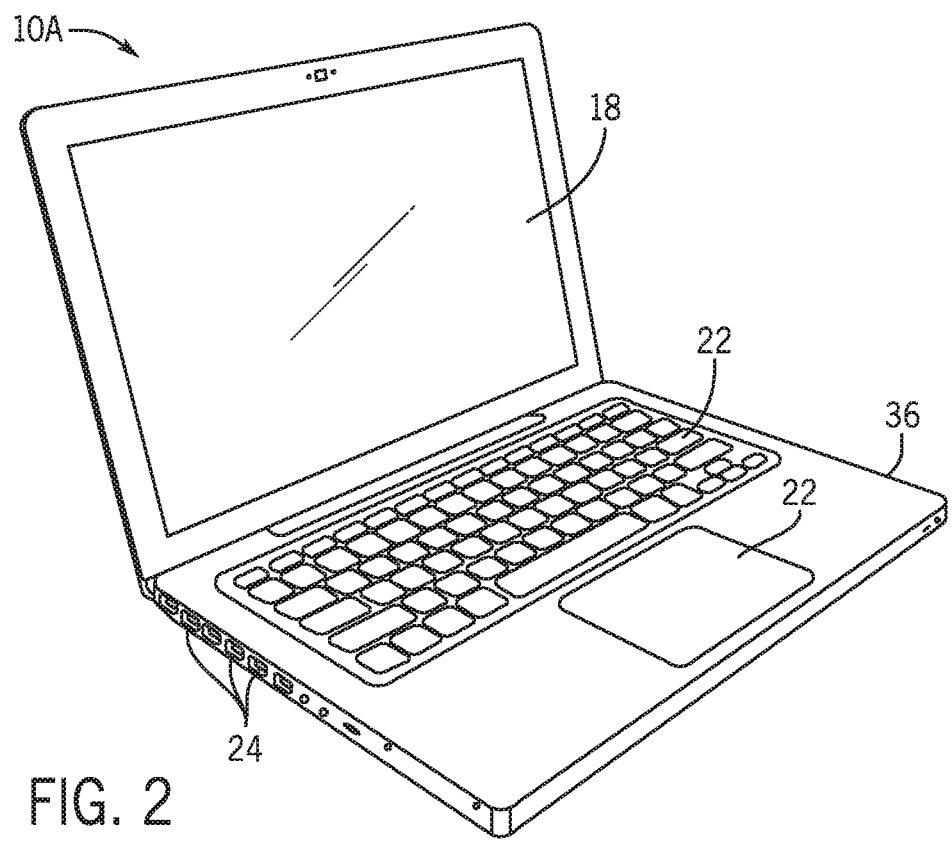
FIG. 2 is a perspective view of a notebook computer representing an embodiment of the electronic device of FIG. 1, in accordance with an embodiment.
Figure 4:
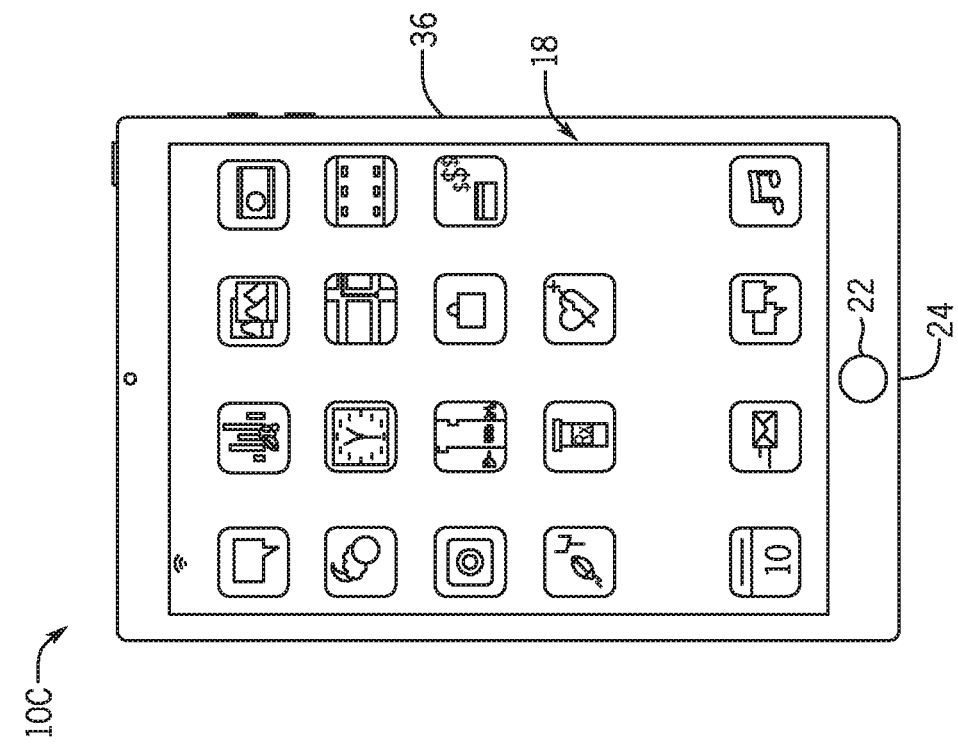
FIG. 4 is a front view of another hand-held device representing another embodiment of the electronic device of FIG. 1, in accordance with an embodiment.
Figure 3:
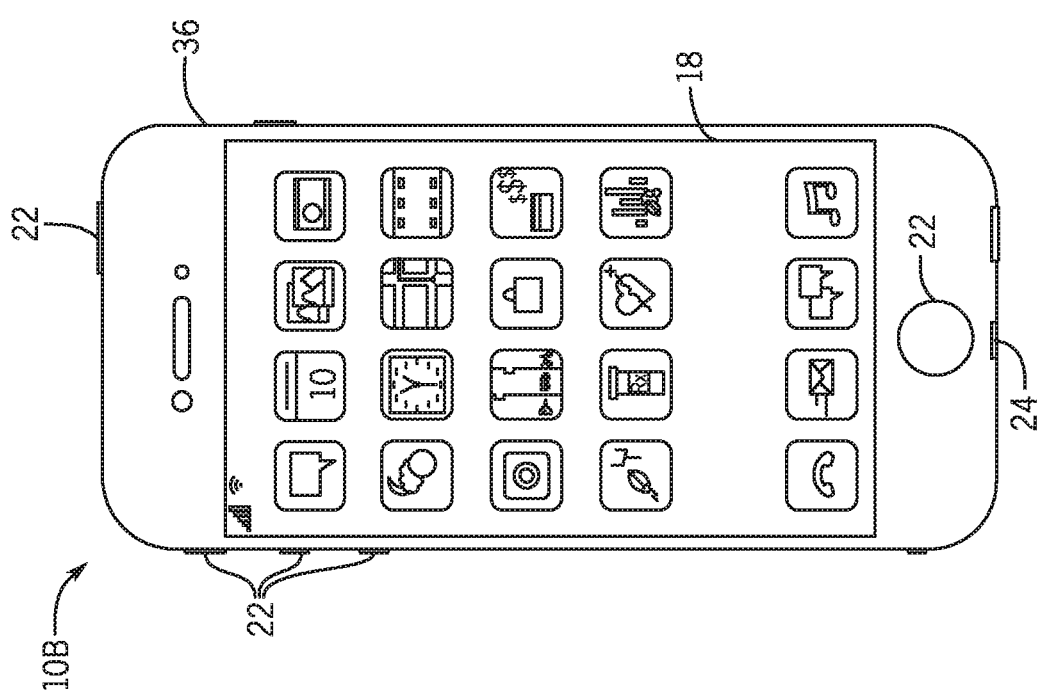
FIG. 3 is a front view of a hand-held device representing another embodiment of the electronic device of FIG. 1, in accordance with an embodiment.
Figure 5:
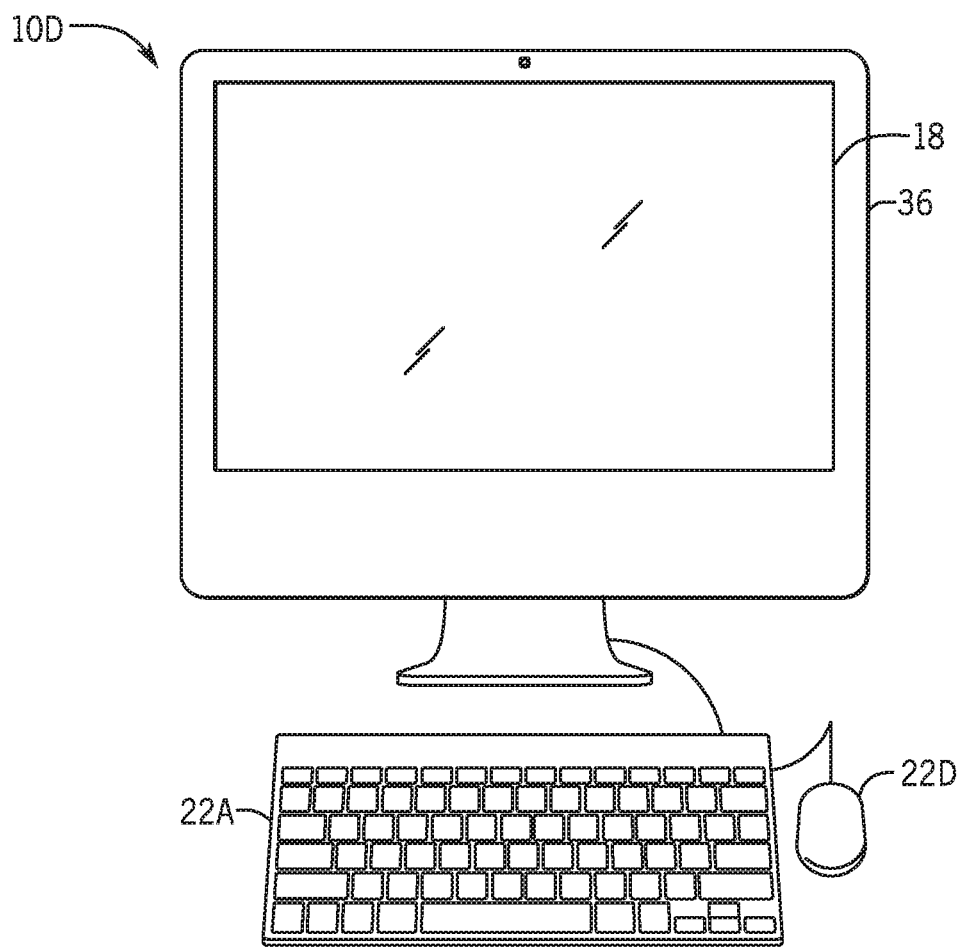
FIG. 5 is a front view of a desktop computer representing another embodiment of the electronic device of FIG. 1, in accordance with an embodiment.
Figure 6:
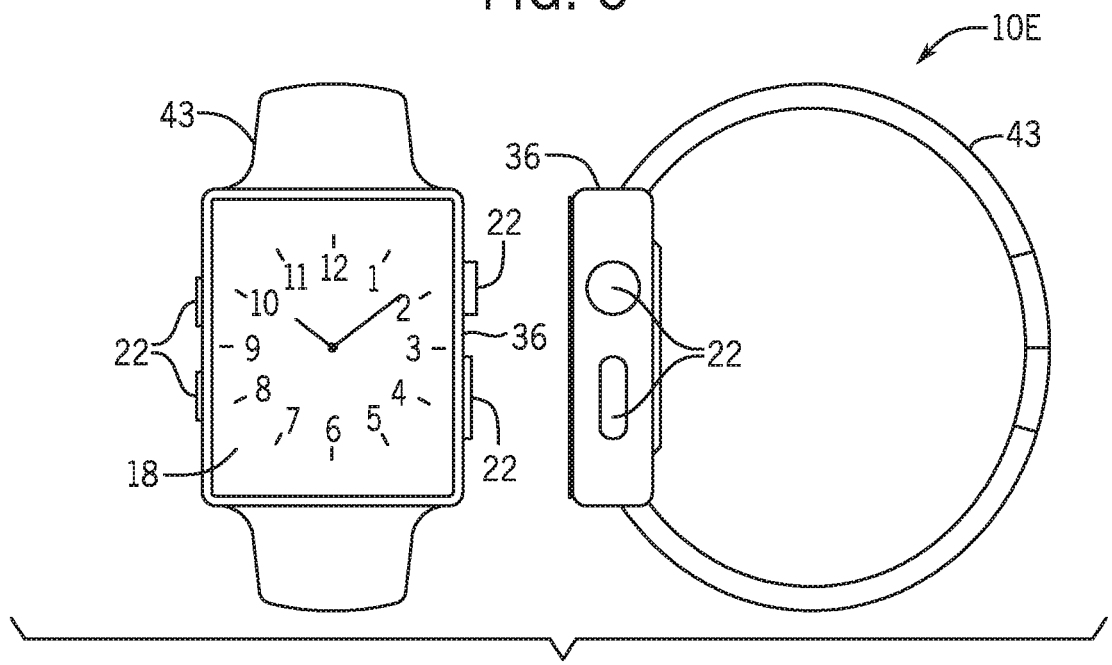
FIG. 6 is a front view and side view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry" or "host." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10. For example, processor(s) 12 may be a central processing unit (CPU) or a general processing unit (GPU). In some implementations, the processor(s) 12 may be a processor disposed in a system-on-chip (SoC). Generally, the processor(s) 12 may be described as a host to display 18, as it provides content that is displayed in display 18.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels. Display 18 may receive images, data, or instructions from processor 12 or memory 14, and provide an image in display 18 for interaction. Display 18 may also include collision-avoidance circuitry along that may be used to provide uniform images to the user, as described herein.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, 4th generation (4G) cellular network, long term evolution (LTE) cellular network, or long term evolution license assisted access (LTE-LAA) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. Enclosure 36 may also include sensing and processing circuitry that may be used to provide correction schemes described herein to provide smooth images in display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
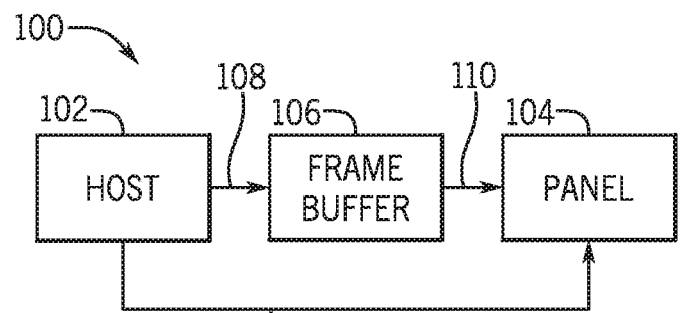
FIG. 7 is a schematic block diagram of a panel operatively coupled to a host in a system that may implement a collision avoidance scheme for display self-refresh, in accordance with an embodiment.

The block diagram 100 illustrated in FIG. 7 describes an illustration of the operational coupling between host 102

(e.g., processor(s) 12) and a panel 104 of a display 18. When the host 102 has new content to be displayed in panel 104, the host 102 may update a frame buffer 106 through a data bus 108. The panel 104 (e.g., a driver integrated circuit (IC) of the panel) may then update its pixels by reading the updated frame buffer 106 via data bus 110. As briefly discussed above, the driver IC coupled to panel 104 may be capable of performing a self-refresh cycle. The self-refresh cycle may include updating the pixels to display blank image or a dark image (e.g., a reset image) to reset the pixels and/or prevent panel damage. The self-refresh cycle may also include displaying the same image that was previously displayed without reading the frame buffer, which may decrease power consumption by the electronic device. The self-refresh cycle may be performed periodically when the panel 104 after a timeout period without new image data arriving in the frame buffer 106. However, due to latency in the transport of image data through data buses 108 and/or 110, image data may become ready to display after the timeout period, but before the end of a self-refresh cycle initiated based on a timeout, resulting in a potential collision. To prevent collision, a low-latency coupling between host 102 and panel 104 that may include a collision-avoidance signal 112 may be used to control the self-refresh activity in the panel. Collision-avoidance signal 112 may mitigate visual artifacts that may occur due to ill-timed self-refresh cycles caused by latency in the transmission of image content via data buses 108 and 110, may cause the panel 104. For example, if a self-refresh cycle takes at least 12.6 ms, collision-avoidance signal 112 may have a latency (e.g., a lag) that is at least 12.6 ms higher than the image data latency through frame buffer (e.g., frame buffer lag) to prevent a self-refresh cycle from delaying the display of image data.

Figure 8:
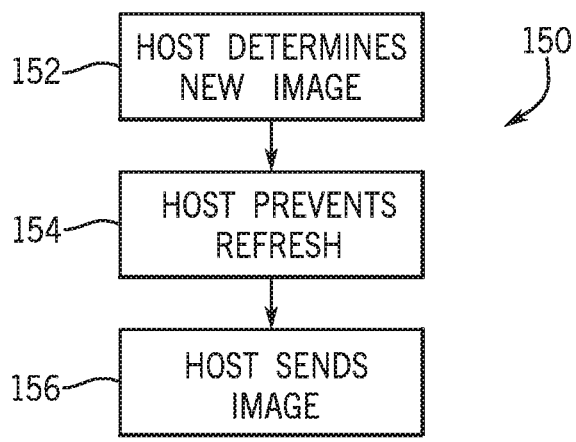
FIG. 8 is a flow chart for a method to implement a collision avoidance scheme, in accordance with an embodiment.

FIG. 8 provides a method 150 to employ the collision-avoidance signal 112 to prevent the visual artifacts discussed herein. The method 150 may be performed by a state machine implemented in a hardware, or firmware, implemented using programmable circuitry, or using software in the host 102. A host 102 may determine that a new image is available or will be available to panel 104 in the near future (process block 152). Based on information such as, which may include frame rate of panel 104, image timeout for self-refresh cycles, and/or time since most recent new image, the host 102 may determine that the new image data may be ready for display in frame buffer 106 during a self-refresh cycle. To prevent the collision, host 102 may prevent the panel 104 from entering a self-refresh cycle using collision-avoidance signal 112 (process block 154). Along with the collision-avoidance signal 112, the host 102 may send an image to the frame buffer 106 via data bus 108 (process block 156). Note that the operations of process blocks 156 and 154 may be performed concurrently or in any order, to suit specifications of electronic device 10, display 18, or host 102. For example, the collision-avoidance signal 112 may be a signal transmitted through an interrupt line that may be asserted by host 102 and polled periodically by the panel 104.

As a result of the polling, the panel 104 may initiate, delay, or prevent the performance of a self-refresh cycle. In certain electronic devices 10, the frame buffer 106 may be part of display 18 and coupled directly to panel 104. In certain devices, the frame buffer 106 may be part of the host 102 circuitry, and the panel may retrieve updated content via an image data bus. Methods described here may also be applicable in devices in which the host 102 drives the panel 104 without a frame buffer 106, as detailed below. A result of the implementation of the above method is that it allows panel 104 having self-refresh cycles with low presentation times, which are defined as the interval between image data being ready for display in frame buffer 106 and its actual display by panel 104. For example, if the panel operates at 60 Hz and polls the frame buffer at four times that frequency (i.e., at 240 Hz), then the presentation time with a collision avoidance may be of 4.17 ms. By contrast, a collision between the image data and the self-refresh cycle may delay the presentation of the imaged by up to 16.7 ms, worsening the presentation time specification of the panel 104.

Figure 9:
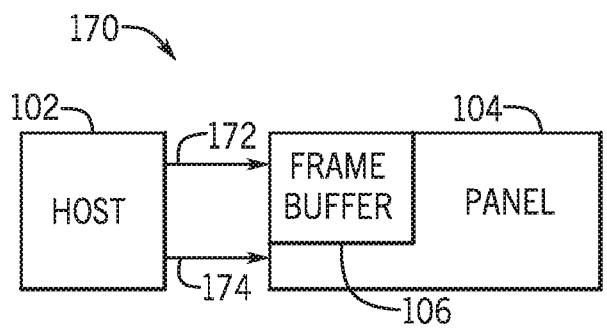
FIG. 9 is a schematic block diagram of a host coupled to a panel having a frame buffer in a system that may implement a collision avoidance scheme for display self-refresh, in accordance with an embodiment.

Block diagram 170 in FIG. 9 illustrates a host 102 that is coupled to a display 18 having a panel 104 directly coupled to frame buffer 106. Host 102 may update frame buffer 106 through a data bus 172, and may prevent self-refresh collisions by asserting a content warning signal, which may be provided as an interrupt signal 174. When the host 102 determines that new content is available to be displayed in the next frame slot, it asserts interrupt signal 174 while it fills the frame buffer 106. The panel 104 may notice the interrupt signal 174 and delay entering into a self-refresh cycle, allowing the new content to appear in a timely manner in panel 104.

Figure 10:
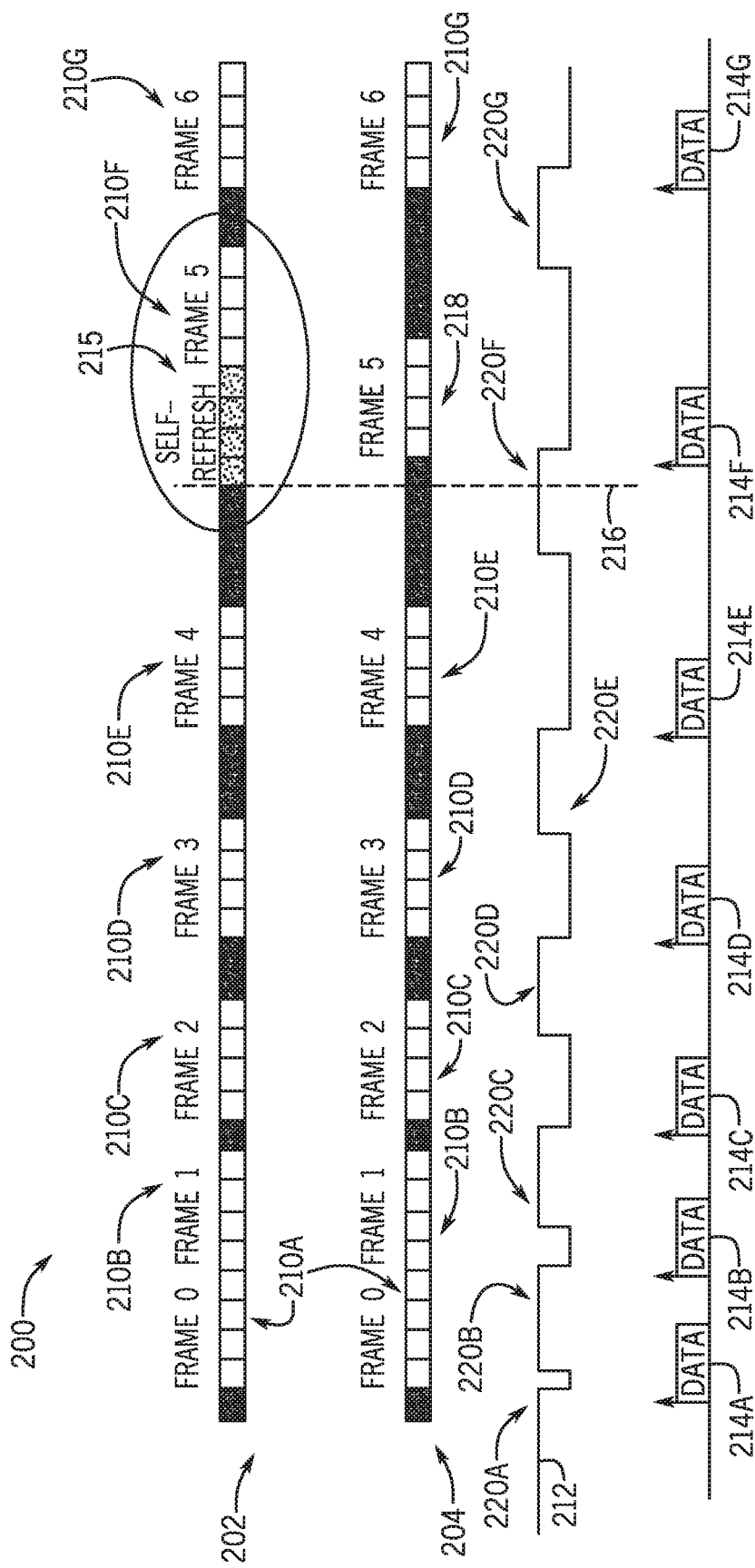
FIG. 10 is a timing diagram that illustrates a collision avoidance scheme that may be used with the system of FIG. 9, in accordance with an embodiment.

Timing diagram 200 in FIG. 10 further exemplifies the collision avoidance system using interrupt signal 174. By way of comparison, display timing 202 illustrates a situation in which a collision may take place, and display timing 204 illustrates a situation in which a collision may be avoided through interrupt signal 174. Each grid element in display timings 202 and 204 represent 4.17 ms in this example. Display timing 202 illustrates a display that may exhibit a series of frames 210A-G. Frame 210A-G may be correspond to image data 214A-G, respectively. In this example, panel 104 is configured to begin a self-refresh cycle if it fails to receive a new frame after more than 12.5 ms or 3 grid elements. Note that frames 210A-E are displayed shortly after the image data 214A-E, as the corresponding image data 214A-E are ready for display before. However, note that in this example, the time between image data 214E and 214F may be longer than 12.5 ms. As a result, the panel initiates a self-refresh cycle 215, which lasts about 16.7 ms or 4 grid elements. Note further that image data 214F is ready to be displayed during the self-refresh cycle (e.g., the self-refresh cycle and the image data collided) and, as a result, frame 210F is displayed substantially after the corresponding image data 214F is available, leading to a delay of about 12.5 ms or 3 grid elements.

Display timing 204 illustrates a situation in which the host 102 asserts the interrupt signal 174, as illustrated in the interrupt waveform 212. The interrupt signal 174 is asserted for a period 220A when the host 102 is sending image data 214A, as illustrated. Similarly, interrupt signal 174 is asserted in periods 220B-G, in order to notify the panel 104 of incoming new content corresponding to image data 214B-G, respectively. In the illustrated example, the interrupt signal 174 may be asserted (e.g., raised to logical high) at least 12.6 ms or 3 grid elements prior to the image data being available, and deasserted shortly after the image data is available (e.g., less than 4.17 ms or one grid element). While the interrupt signal 174 is asserted, the panel 104 may be blocked from initiating a self-refresh cycle. For example, the assertion during period 220F prevents the panel to initiate a self-refresh cycle at time 216, in order to present frame 218 in a timely manner.

Figure 11:
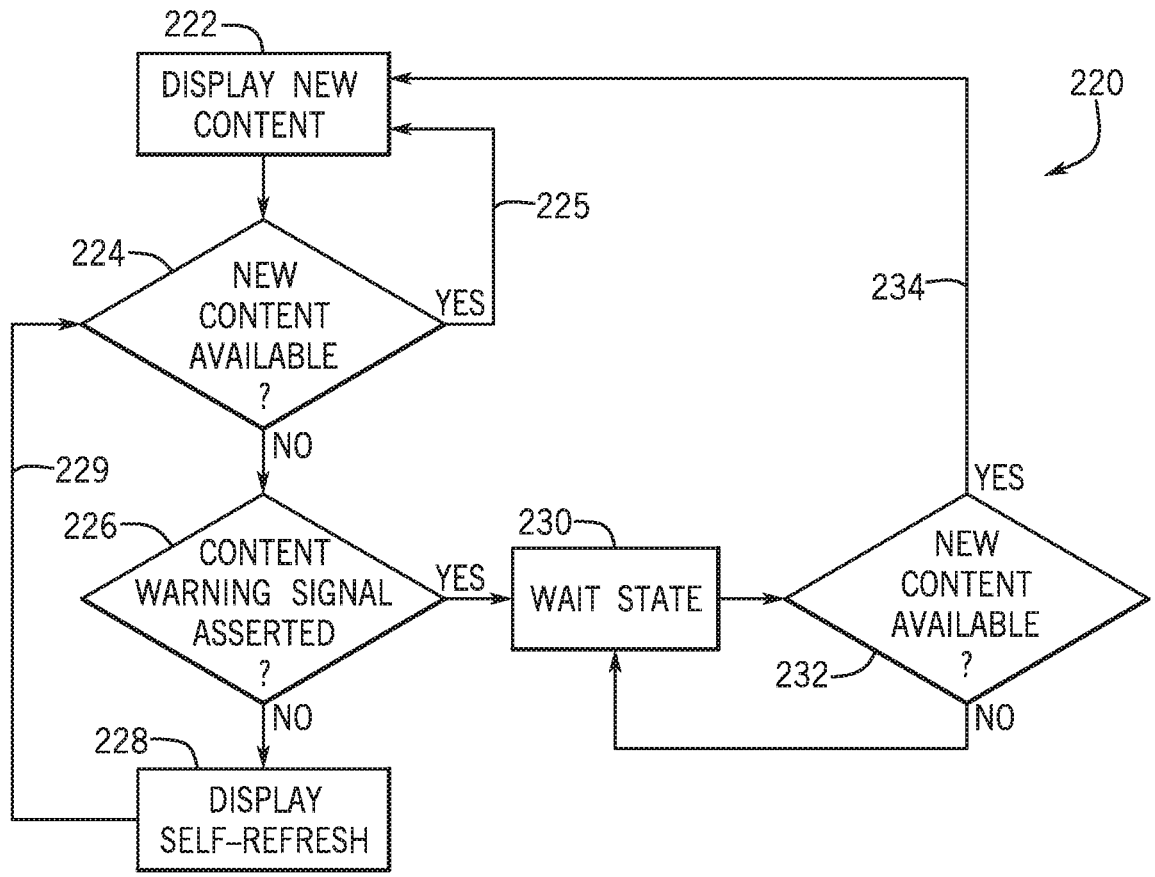
FIG. 11 is a flow chart for a method to implement a collision avoidance scheme that may be used with the system of FIG. 9, in accordance with an embodiment.

FIG. 11 illustrates a flow chart of method 221 to be performed by a panel 104 having the interrupt signal 174 to implement the collision avoidance scheme described above.

At process block 222, panel 104 may display a new content available in a frame buffer 106. If after a timeout period there is a new content available (process block 224), the panel 104 may loop back into process block 222 via branch 225. The timeout period may be a timeout window that is associated to a timing for self-refresh cycles. If no content is available after the timeout period for self-refresh (process block 224), the system may check the state of the interrupt signal 174 (process block 226). If the interrupt signal is not asserted, the panel 104 may initiate a self-refresh cycle (process block 228) and, following that, may return to process block 224. If, interrupt signal 174 is asserted (process block 226), method 221 waits for the new content corresponding to that interrupt cycle. This waiting may be performed by a waiting loop that includes process blocks 230 and 232. At process block 230, method 221 remains in a waiting period. After a timeout, method 221 checks for new content at process block 232. If the content indicated by the interrupt signal 174 is not available, method 221 returns to process block 230. Once the new content becomes available (branch 234), the new content is displayed at process block 222. The above-discussed method 221 may be implemented via logic circuitry inserted in the panel 104 or via software. The above method may be modified to accommodate specifications of the host 102, display 18, and/or electronic device 10.

Figure 12:
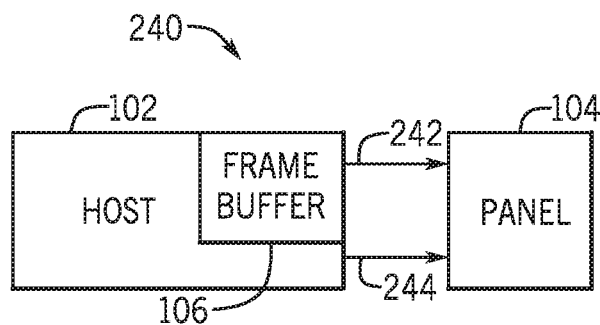
FIG. 12 is a schematic block diagram of a panel coupled to a host having a frame buffer in a system that may implement a collision avoidance scheme for display self-refresh, in accordance with an embodiment.

Block diagram 240 in FIG. 12 illustrates a system in which host 102 may have frame buffer 106. Host 102 may be coupled to panel 104 of display 18 through data bus 242. In some implementations, the host 102 may also be coupled to panel 104 through a self-refresh signal 244, while in other implementations the self-refresh signal may be provided via data bus 242, as detailed below. In the system represented by block diagram 240, the host 102 may manage and/or trigger the self-refresh cycles in panel 104. This may be accomplished by the host 102 determining when new content may be available for display and, based on that determination, instructing the panel to self-refresh. Note that a system without a frame buffer 106 may employ schemes similar to the ones described with respect to the system represented by block diagram 240, with small changes.

Figure 13:
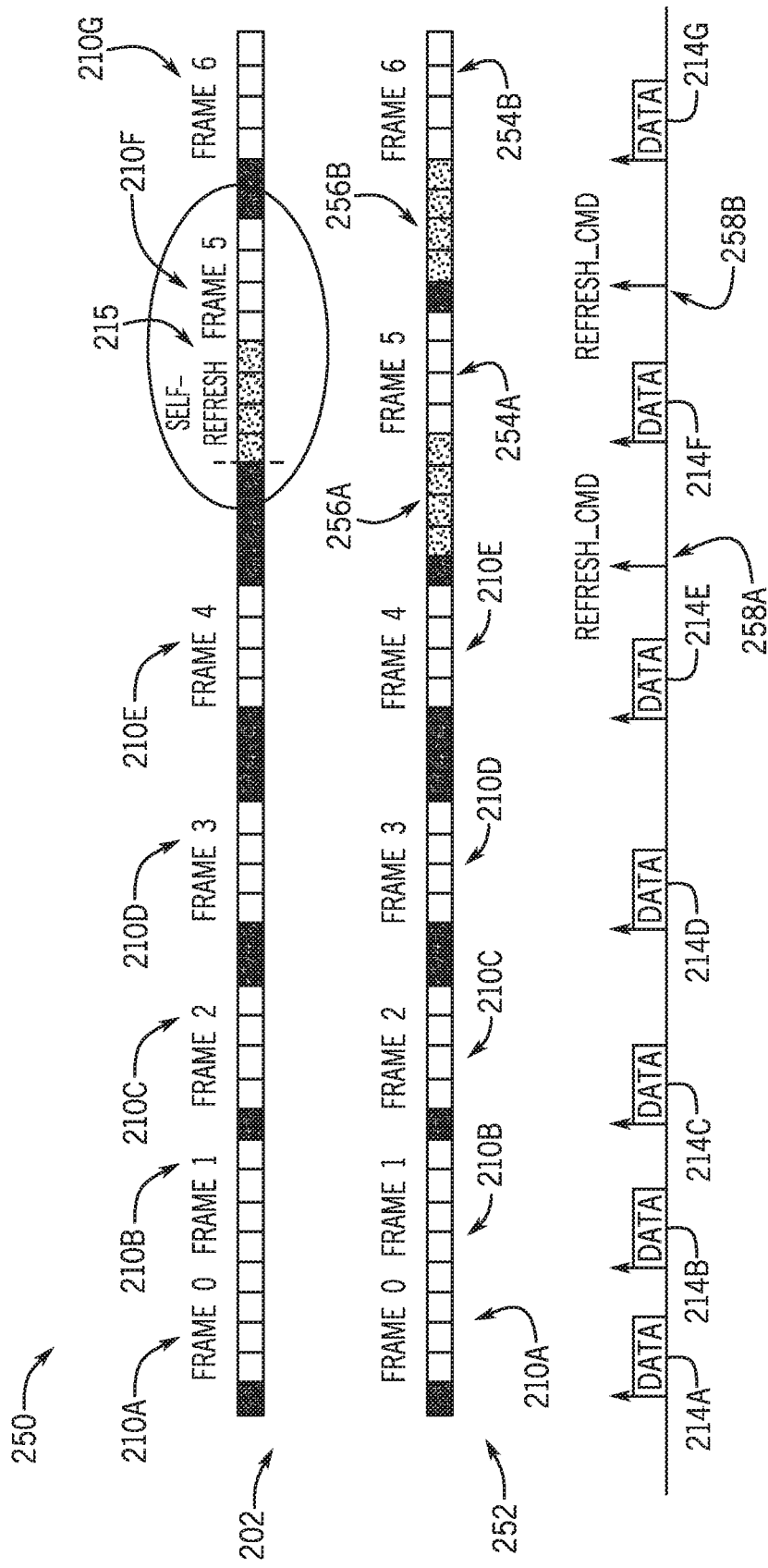
FIG. 13 is a timing diagram that illustrates a collision avoidance scheme that may be used with the system of FIG. 12, in accordance with an embodiment.

Timing diagram 250 in FIG. 13 illustrates the collision avoidance scheme employing a self-refresh signal 244. By way of comparison, display timing 202 illustrates a situation in which a collision may take place, and display timing 252 illustrates a situation in which a collision may be avoid by active management by host 102. Each grid element in display timings 202 and 252 represent 4.17 ms in this example. As in the examples in FIG. 10, in both diagrams, the host 102 provides image data 214A-G to be displayed by a panel 104. As discussed with respect to FIG. 10, display timing 202 illustrates a collision that may take place between the self-refresh cycle 215 and image data 214F, causing a delay in the display of frame 210F. Display timing 252 illustrates a situation in which the host manages the self-refresh cycles of the panel 104 by providing self-refresh signals 258A and 258B. Notice in display timing 252 that self-refresh cycles 256A and 256B are initiated after self-refresh signals 258A and 258B, respectively. Host 102 determines when to send a self-refresh signal based on a determination of when the next image data is ready to be displayed.

Figure 14:
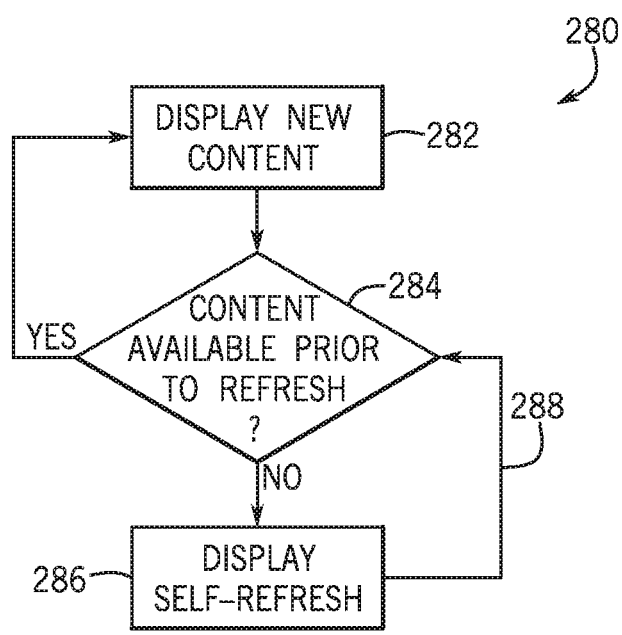
FIG. 14 is a flow chart for a method to implement a collision avoidance scheme that may be used with the system of FIG. 12, in accordance with an embodiment.

FIG. 14 illustrates a flow chart of a method 280 to be performed by a host 102 that manages the self-refresh cycle through self-refresh signals 244 discussed herein. At process block 282, host 102 provides image data to panel 104 for display of new content. At process block 284, host 102 determines the time interval at which the next content will be ready for display. The host 102 may, for example, identify a target display time for displaying the upcoming content. If that time interval is higher than a self-refresh interval, host 102 may arbitrate between waiting, sending a self-refresh signal or sending image data to panel 104 (process block 286). Following the self-refresh cycle, host 102 may return to process block 284 via branch 288. If the host 102 determines that the time interval for the next content to be ready is smaller than the duration of the self-refresh cycle, host 102 may send image data to the panel 104.

Time charts 300 and 320 in FIGS. 15A and 15B further illustrate schematically the effect of implementation of a collision avoidance method such as method 150, 221 and/or 280. Chart 300 illustrates the displayed content 301 in a display over time 302. The displayed content 301 may include a first frame 304 and a second frame 306. Each frame may have a display period 314. The display may be also configured to generate a self-refresh cycle 308 which may collide with the second frame 306. In the illustrated example, the self-refresh cycle 308 may begin at time 310, and may last a period 316, ending at time 312. If a desired display time for the second frame 306 is between time 310 and 312, frame 306 and self-refresh cycle 308 collide, inducing a lag in the display of the second frame. The induced lag may be as large as self-refresh cycle period 316, as for example, if a desired begin time for the second frame 306 is time 310. In systems where the self-refresh cycle period 316 is the same as the frame period 314, the delay to the presentation time may be as high as one frame duration. Time chart 320 illustrates the effect of the collision avoidance signal 321 in the collision avoidance method. In this example, a warning signal 322, which may be may be used to prevent collision avoidance. Following a display of the first frame 304, the image host may display of second frame 306 at time 310. To that end, the host may trigger (e.g., assert) a warning signal at time 324, which may be calculated by a difference at the display time 310 and a warning signal period 326. The warning signal period may be equal or larger than the self-refresh cycle period 316. While the warning signal period is high (e.g., after time 324), the display is prevented from entering a self-refresh cycle and, thus, is available to display second frame 306. Note that the warning signal may also be lowered (e.g., deasserted) at time 310, or after time 310 to allow a future self-refresh cycle.

More generally, the warning signal 322 (Tw) may be smaller than the self-refresh cycle period 316 (Tf). Note further that the driver IC may have an internal timestep Ts, which may be due to the frequency of operation of the driver IC circuitry. In such system, the use of the warning signal may allow a bounded presentation time, which may be given by the expression max (Tf−Tw, Ts). Note that, as discussed above, if the warning signal period Tw is larger than the self-refresh cycle Tf, the presentation time may be as small as the duration of the driver IC operation (e.g., internal state machine period, software processing period) Ts.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
a host configured to provide image data and a content warning signal;
a frame buffer configured to receive the image data via a data bus; and
a panel configured to:
poll an electrical coupling between the host and the panel for the content warning signal if the frame buffer does not include new image data;
if the content warning signal is not present, enter a self-refresh cycle based on an image timeout, wherein the self-refresh cycle comprises displaying a previous image when the image data in the frame buffer does not change; and
if the content warning signal is present, wait for new image data instead of entering the self-refresh cycle.

2. The system of claim 1, wherein the frame buffer comprises a first lag, and wherein the content warning signal comprises a second lag that is smaller than the first lag.

3. The system of claim 1, wherein the content warning signal comprises a warning period, and wherein the panel is configured to prevent the self-refresh cycle during the warning period.

4. The system of claim 3, wherein a presentation time of the panel is smaller than a difference between a period of the self-refresh cycle and a duration of the warning period.

5. The system of claim 3, wherein the host is configured to provide a self-refresh command to the panel, wherein the host arbitrates between sending a self-refresh signal or the image data, and wherein the panel is configured to perform the self-refresh cycle upon receiving the self-refresh command.

6. The system of claim 1, wherein the panel is configured to receive the image data at a variable display update rate.

7. The system of claim 1, wherein the panel comprises an organic light emitting diode (OLED) panel.

8. The system of claim 1, wherein the host comprises a system on chip.

9. The system of claim 1, wherein the host comprises a central processing unit, a graphics processing unit, or both.

10. A panel comprising:
a driver integrated circuit configured to:
poll a frame buffer for new image data;
if the frame buffer comprises new image data, cause the panel to display an image based on the new image data in the frame buffer using a data bus;
if the frame buffer does not comprise new image data, poll an image interrupt line for an image warning signal;
if the image warning signal is not present, cause the panel to display an image stored in a memory of the driver integrated circuit using the data bus; and
if the image warning signal is present, wait until the frame buffer comprises new image data by polling the frame buffer for the new image data.

11. The panel of claim 10, wherein the panel comprises the frame buffer, and wherein the panel is configured to couple to a host via a connection configured to carry the new image data and the image warning.

12. The panel of claim 10, wherein the panel is configured to receive image data at a variable display update rate.

13. The panel of claim 10, wherein the new image data is associated with a target display time, wherein a difference between the target display time and an actual display time is smaller than max (Tf−Tw,Ts), wherein Tf corresponds to an image data period, Tw corresponds to an image warning period, and Ts corresponds to an internal timestep of the driver integrated circuit.

14. The panel of claim 10, wherein the panel is configured to operate at a frame rate, and wherein the driver integrated circuit is configured to cause the panel to display images at the frame rate.

15. An electronic device, comprising:
a display comprising a display panel driver; and
a host coupled to the display panel driver, wherein the host is configured to:
provide image data to the display using a first data bus; and
provide a content warning signal to the display to prevent the display from entering a self-refresh cycle; wherein the display panel driver is configured to:
poll a frame buffer for new image data;
if the frame buffer comprises new image data, cause the display to display an image based on the new image data in the frame buffer;
if the frame buffer does not comprise new image data, poll an image interrupt line for an image warning signal;
if the image warning signal is not present, cause the display to display an image stored in a memory of the display panel driver; and
if the image warning signal is present, wait until the frame buffer comprises new image data by polling the frame buffer for the new image data.

16. The electronic device of claim 15, wherein, after receiving the content warning signal, the display panel driver is configured to:
wait for new image content for a period of time; and
determine whether new image content is received within a threshold amount of time after receiving the content warning signal.

17. The electronic device of claim 16, wherein the display panel driver is configured to continue waiting for new image content upon determining that the new image content was not received within the threshold amount of time.

18. The electronic device of claim 15, wherein the display panel driver is configured to cause the display to enter the self-refresh cycle in the absence of the content warning signal.

19. The electronic device of claim 15, wherein the display panel driver is coupled to the host via:
an image data bus that carries the image data; and
an interrupt line that carries the content warning signal.

20. The electronic device of claim 15, wherein the display panel driver is configured to cause the display to enter the self-refresh cycle when new image data is not available within a threshold period of time.

* * * * *